(12) United States Patent
Sundararajan et al.

(10) Patent No.: US 9,221,415 B2
(45) Date of Patent: Dec. 29, 2015

(54) METHOD OF ASSEMBLING AND PACKING AN AUTOMOTIVE AIRBAG

(71) Applicant: FORD GLOBAL TECHNOLOGIES, LLC, Dearborn, MI (US)

(72) Inventors: Srinivasan Sundararajan, Ann Arbor, MI (US); Derek Board, Ferndale, MI (US); Edward J. DeSmet, Canton, MI (US); Kevin Pline, Plymouth, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/183,724

(22) Filed: Feb. 19, 2014

(65) Prior Publication Data

US 2015/0232054 A1     Aug. 20, 2015

(51) Int. Cl.
*B60R 21/18* (2006.01)
*B60R 21/231* (2011.01)
*B32B 37/06* (2006.01)
*B32B 37/18* (2006.01)
*B32B 38/00* (2006.01)

(52) U.S. Cl.
CPC .............. *B60R 21/18* (2013.01); *B32B 37/06* (2013.01); *B32B 37/18* (2013.01); *B32B 38/0004* (2013.01); *B60R 21/231* (2013.01); *B32B 2571/00* (2013.01); *B32B 2605/00* (2013.01); *Y10T 156/1062* (2015.01)

(58) Field of Classification Search
CPC ...... B60R 21/18; B60R 21/231; B29C 65/08; D10B 2505/124
USPC ............................................................ 280/733
See application file for complete search history.

(56) References Cited

U.S. PATENT DOCUMENTS

| 6,276,714 B1 * | 8/2001 | Yoshioka ................. 280/733 |
| 6,705,641 B2 | 3/2004 | Schneider et al. |
| 8,136,210 B2 * | 3/2012 | Strutz ..................... 24/163 R |
| 8,317,222 B2 | 11/2012 | Arnold et al. |
| 2006/0292950 A1 | 12/2006 | Hill |
| 2012/0038137 A1 * | 2/2012 | Wipasuramonton et al. . 280/733 |

FOREIGN PATENT DOCUMENTS

| WO | 9723367 | 7/1997 |
| WO | 9965733 | 12/1999 |

* cited by examiner

*Primary Examiner* — Keith Frisby
(74) *Attorney, Agent, or Firm* — Frank MacKenzie; MacMillan, Sobanski & Todd, LLC

(57) ABSTRACT

A method of assembling an airbag for a seatbelt restraint such that the deflated airbag lays flat when it is stacked and secured to a webbing of the seatbelt. The airbag is assembled from a plurality of material strips. The strips are edge joint welded together so that the joints lay flat between the individual strips comprising the airbag.

13 Claims, 3 Drawing Sheets

METHOD OF ASSEMBLING AND PACKING AN AUTOMOTIVE AIRBAG

BACKGROUND OF INVENTION

The present invention relates to a method of assembling an automotive airbag and in particular to a method of assembling an automotive airbag such that it packs flat.

Automotive vehicles use airbag systems to protect a vehicle occupant during collisions. The airbag is a bag that rapidly inflates during a collision to provide cushioning for the vehicle occupant. A housing from which the airbag deploys may be located throughout a vehicle passenger compartment, including being incorporated into a webbing of a seatbelt restraint.

The seatbelt webbing in automotive vehicles typically slides over a D-ring when extended and retracted. However, incorporating the airbag into the webbing increases the thickness of the webbing and the tendency of the webbing to bubble up or pucker. The increased thickness and tendency to bubble up or pucker makes the airbag incorporating webbing both less aesthetically pleasing to the vehicle occupant and more difficult to pass over the D-ring and thus more difficult to for the vehicle occupant to don and doff the seatbelt. The difficulty in passing over the D-ring may necessitate designing the seatbelt system so the airbag component does not pass over the D-ring, which then may require the addition of a second retractor for the lap portion of the seatbelt assembly. This makes packing the system with a vehicle more difficult and costly. Additionally, in applications where a D-Ring is not required, such as a sedan, a thin flexible airbag pack is still desired to allow for the webbing with integrated airbag to be stowed on a conventional sized retractor.

SUMMARY OF INVENTION

An embodiment contemplates a method of assembling and packing an airbag. Stacking a plurality of material strips having first and second edges. Welding pairs of first edges together and pairs of second edges together, the pairs of second edges being staggered from the pairs of first edges, to form an accordion stack in which the strips in the stack lay flat. Forming a tube having first and second openings by edge joint welding together top and bottom strips of the stack. Closing the first and second openings by edge joint welding to form an inflatable bag. Securing the bag to a seatbelt webbing.

Another embodiment contemplates a safety restraint airbag assembly comprising an inflatable bag comprising a plurality of material strips edge joint welded together such that, at weld joints between the strips, the strips lay flat in a stack. The bag is secured to a seatbelt webbing.

Another embodiment contemplates a method of assembling and packing an airbag. Welding a plurality of material strips into an inflatable bag such that, at weld joints between the plurality of strips, a first strip lays flat on top of a second strip. Stacking the strips in a stack. Securing the bag to a seatbelt webbing.

An advantage of an embodiment is that the airbag packs flat, which is advantageous when used in the seatbelt restraint, and may also be useful for other vehicle airbag applications. This reduces cost and complexity of needing a second seatbelt retractor, or taking up more packaging space then is desirable by allowing for a conventional sized seatbelt retractor. The seatbelt is also easier for the vehicle occupant to don and doff.

DETAILED DESCRIPTION

Figure 1:
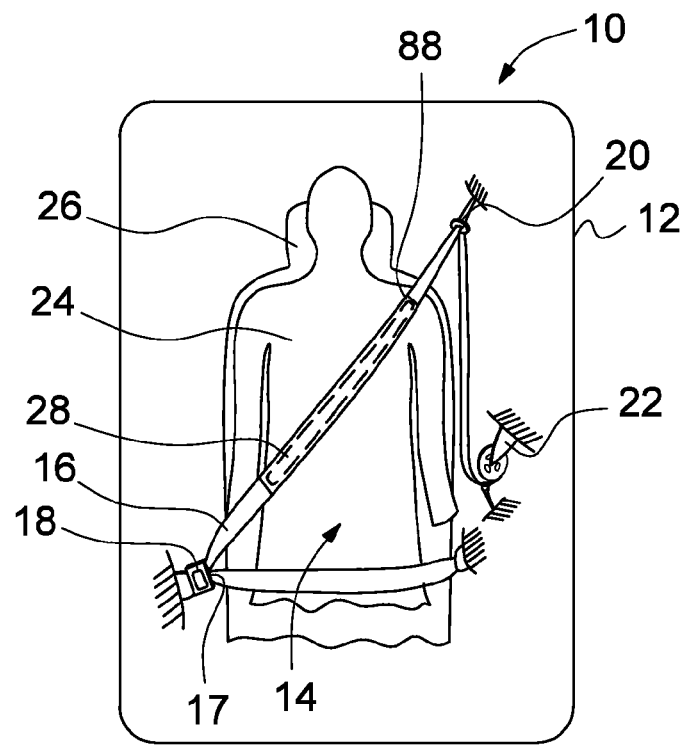
FIG. 1 is a schematic elevation view of an airbag in a seatbelt restraint.

FIG. 1 schematically illustrates a seatbelt airbag system 10 for an automotive vehicle 12. The seatbelt airbag system 10 is merely exemplary, and may take other forms, which may be a three point system or a four point belt system. The seatbelt airbag system 10 includes a seatbelt restraint 14. The seatbelt restraint 14 may be a type known to one skilled in the art. For example, illustrated is a three-point seatbelt restraint comprising a seatbelt webbing 16, a buckle 18, a D-ring 20, and a retractor 22. The webbing 16 is secured to vehicle structure or a vehicle seat 26 at a first end, passes over the D-ring 20 and is guided towards the retractor 22, which receives a second end of the webbing 16. The retractor 22 provides tension in the webbing 16 by taking up and spooling an excess of the webbing 16. The webbing 16 passes through the tongue slot 17 which attaches to the buckle 18 and holds the seatbelt restraint 14 across a vehicle occupant 24 seated in the automotive vehicle seat 26. An airbag 28 is secured to the webbing 16. For example, the airbag 28 may be secured in a sleeve 88 on the airbag 28.

Figure 2:
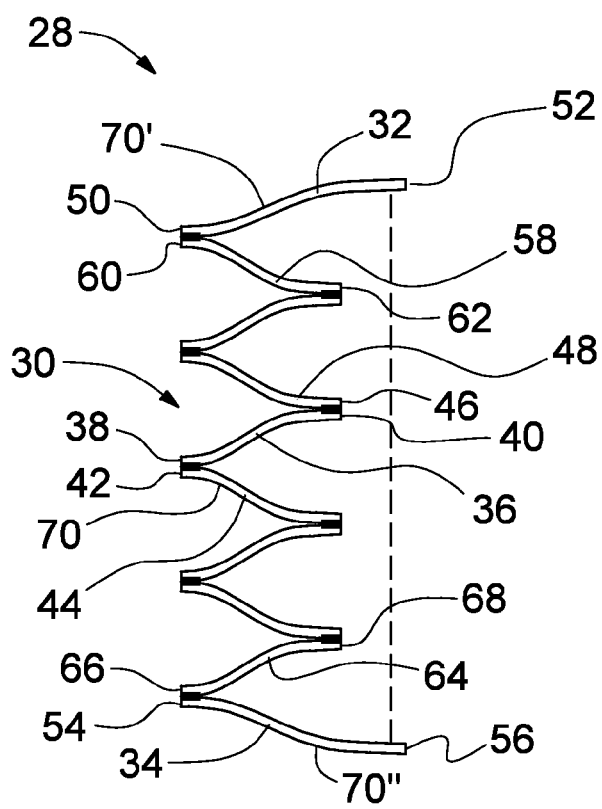
FIG. 2 is a schematic elevation view of an airbag assembly.

FIG. 2 schematically illustrates an airbag assembly. A method of assembling the airbag 28 for packing flat in the seatbelt airbag system 10 will also be discussed relative to FIG. 2. A plurality of intermediate strips 30 is vertically stacked between a top strip 32 and a bottom strip 34. The intermediate strips 30 each have a first and second edge. The intermediate strips 30, the top strip 32, and the bottom strip 34 are fabricated from airbag material known to one skilled in the art. For example, the material may be a woven nylon fabric. A volume of the airbag 28 is a function of, in part, a quantity of intermediate strips 30 between the top strip 32 and the bottom strip 34. The greater the quantity of the intermediate strips 30, the greater the volume of the airbag 28. The width of each strip 30 is generally determined by the width of the webbing 16, which may also affect the volume of the airbag 28. The intermediate strips 30 may all be the same size or vary in size.

The intermediate strips 30 are welded together in accordance with a weld pattern. In the weld pattern, a first edge 38 of a first strip 36 is edge joint welded to a first edge 42 of a second strip 44. A second edge 40 of the first strip 36 is edge joint welded to a second edge 46 of a third strip 48. The second strip 44 and the third strip 48 are on opposite sides of the first strip 36. Neither the first edge 38 nor the second edge 40 of the first strip 36 are welded to both the second strip 44 and the third strip 48. The weld pattern results in the edge joint welds of the intermediate strips 30 being staggered between the first and second edges. The airbag 28 may be assembled by sequentially stacking and edge joint welding adjacent strips. Alternatively, the airbag 28 may be assembled by stacking all the strips and then, after stacking, edge joint welding the strips. In either case, the result is an accordion (bellows) shape.

Assembly of the airbag 28 uses edge joint welds. As understood by one skilled in the art, an edge joint weld involves laying a first substrate flat on a second parallel, or nearly parallel, substrate and welding a contact area between the first and second substrates along an edge. The edge joint weld allows the two substrates to be retained parallel and flat against each other. As used for the airbag 28, the edge joint weld permits an upper strip to lay flat on top of a lower strip, including at a joint between the upper and lower strips. By using the edge joint weld, the intermediate strips 30 stack flat between the top strip 32 and the bottom strip 34. In the weld pattern, the use of the edge joint weld allows the first strip 36, the second strip 44, and the third strip 48 to stack flat.

The top strip 32 has a first edge 50 and a second edge 52. The bottom strip 34 has a first edge 54 and a second edge 56. The top most intermediate strip 30 is a top transition strip 58. The top transition strip 58 has a first edge 60 and a second edge 62. The first edge 60 of the top transition strip 58 is edge joint welded to the first edge 50 of the top strip 32. The second edge 62 is edge joint welded in accordance with the weld pattern. The bottom most intermediate strip 30 is a bottom transition strip 64. The bottom transition strip 64 has a first edge 66 and a second edge 68. The first edge 66 of the bottom transition strip 64 is edge joint welded to the first edge 54 of the bottom strip 34. The second edge 68 is edge joint welded in accordance with the weld pattern. The second edge 52 of the top strip 32 is welded to the second edge 56 of the bottom strip 34.

The intermediate strips 30, top strip 32, and bottom strip 34 have a first face 70. The first face 70 alternates between facing upward and downward in the intermediate strips 30. The first face 70' of the top strip 32 faces opposite the orientation of the first face 70 of the top transition strip 58 and the first face 70" of the bottom strip 34 faces opposite the orientation of the first face 70 of the bottom transition strip 64. This puts the first face 70 outside the volume of the airbag 28 when the airbag 28 inflates. The first face 70 may be coated. For example, the first face 70 may be coated with a silicone coating to retain an inflation gas longer when the airbag 28 is inflated.

Fabrication of the intermediate strips 30, top strip 32, and bottom strip 34 allows for measurement tolerances. The material strips may be cut from a double layer of material. This results in paired upper and lower strips. An upper strip matches the size of its corresponding lower strip. When the pairs of upper and lower strips are located, an equal number of strips from the center of the intermediate strips 30, the summed tolerance of the upper strips will be offset by the summed opposite tolerance of the lower strips.

In a direction perpendicular to a weld of the weld pattern, the top strip 32 and bottom strip 34 have a greater dimension than the intermediate strips 30. This allows the second edge 52 of the top strip 32 to reach the second edge 56 of the bottom strip 34 for welding. Further, first and second edges of the intermediate strips 30, top strip 32, and bottom strip 34 are on non-intersecting lines. The edge joint weld may be made by any suitable welding technique known to one skilled in the art. For example, the welds may be ultrasonic.

Figure 3:
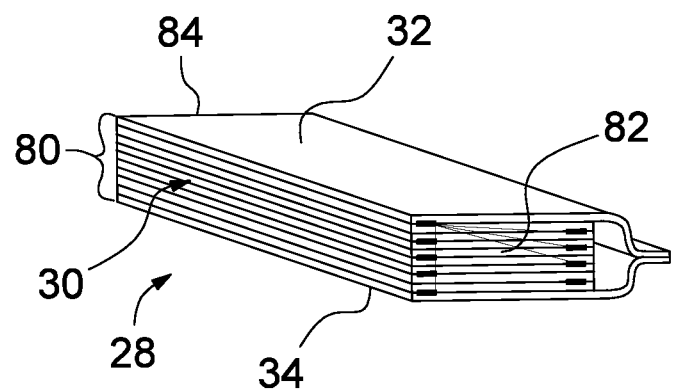
FIG. 3 is a schematic perspective view of an airbag assembly.

FIG. 3 schematically illustrates the airbag 28 with all first and second edges welded. The weld pattern assembles the intermediate strips 30 into a Z-shaped accordion stack 80. The airbag 28 has a first end 82 and a second end 84. The first end 82 and the second end 84 are welded closed so that the volume of the airbag 28 may be inflated.

Figure 4:
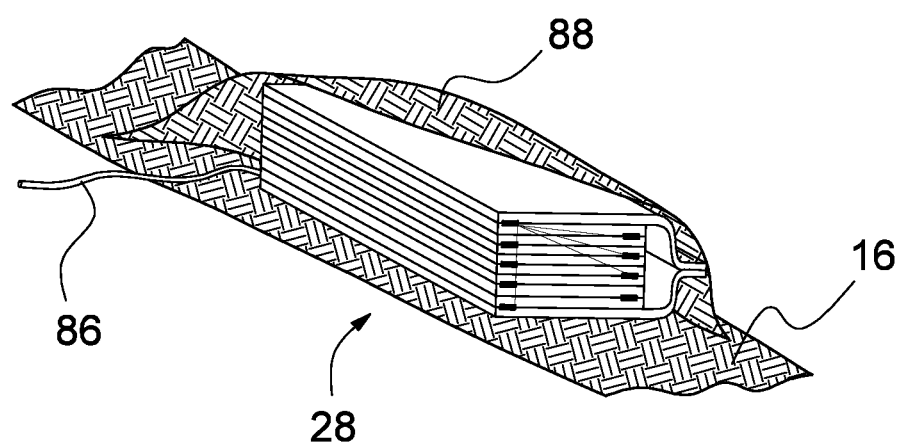
FIG. 4 is a schematic perspective view of a packed airbag.

FIG. 4 schematically illustrates a packed and uninflated airbag 28. Connected to the airbag 28 is an inflation input 86. The inflation input 86 is used to deploy the airbag. The uninflated airbag 28 is secured in the sleeve 88 (illustrated partially cutaway for clarity) of the seatbelt webbing 16.

Figure 5:
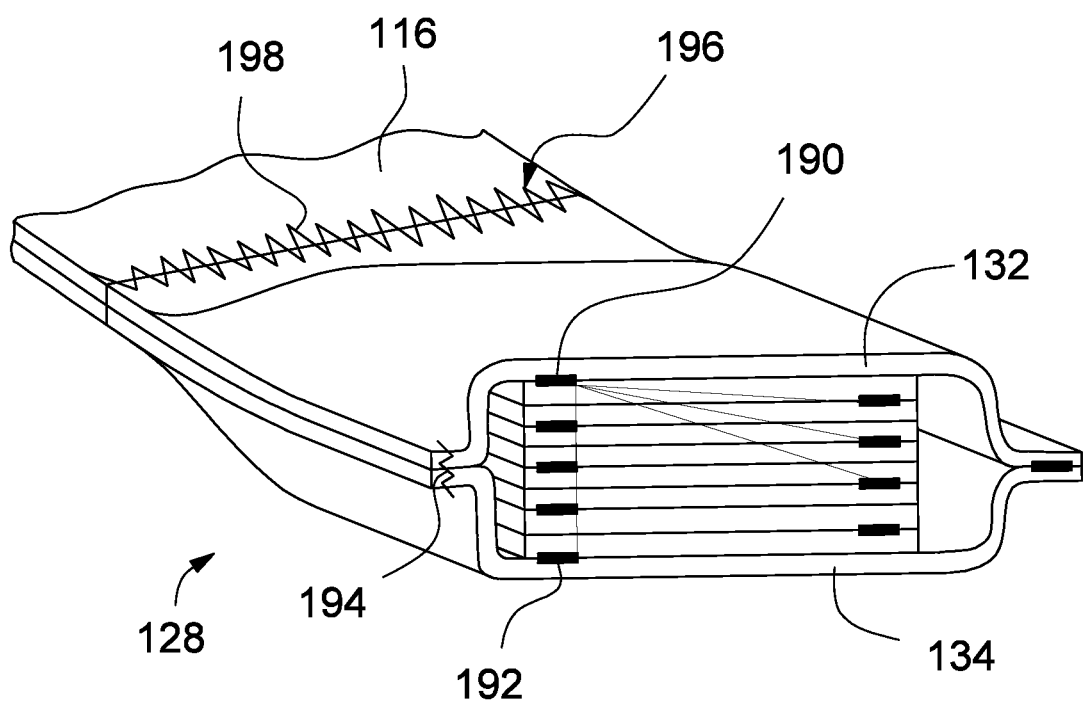
FIG. 5 is a schematic perspective view of an airbag assembly.

FIG. 5 schematically illustrates an airbag 128. As FIG. 5 is a variation of the airbag illustrated in FIG. 2 and FIG. 3, like reference numerals designate corresponding parts in the drawings (but with 100 series element numbers) and detailed description thereof will be omitted.

A top strip 132 extends beyond a top weld 190 and a bottom strip 134 extends beyond a bottom weld 192. Beyond welds 190 and 192, the top and bottom strips 132 and 134, respectively, are joined by a rip stitch 194. The rip stitch 194 allows the top and bottom strips 132 and 134, respectively, to unstitch when airbag 128 inflates.

The top and bottom strips 132 and 134, respectively, contain the airbag 28 without needing the sleeve 88 illustrated in FIG. 4. The top and bottom strips 132 and 134, respectively, may be fabricated from a tactilely pleasing material that still allows for gas retention when airbag 128 is inflated. Alternatively, outward faces of the top strip 132 and bottom strip 134, respectively, may have a tactilely pleasing coating or layer.

The top and bottom strips 132 and 134, respectively, are sewn at a joint 196 to a seatbelt webbing 116 by a stitch 198. Alternatively, the top and bottom strips 132 and 134, respectively, may be seatbelt webbing.

While certain embodiments of the present invention have been described in detail, those familiar with the art to which this invention relates will recognize various alternative designs and embodiments for practicing the invention as defined by the following claims.

What is claimed is:

1. A method of packing an automotive airbag comprising:
   stacking a plurality of material strips having first and second edges;
   edge joint welding pairs of first edges together and pairs of second edges together, the pairs of second edges being staggered from the pairs of first edges, to form an accordion stack in which the strips in the stack lay flat;
   forming a tube having first and second openings by edge joint welding together top and bottom strips of the stack;
   closing the first and second openings by edge joint welding to form an inflatable bag; and
   securing the bag to a seatbelt webbing.

2. The method of claim 1 wherein the strips have first and second faces and the strips are arranged such that the first faces are outside the bag when the bag is inflated.

3. The method of claim 2 wherein the first face is coated.

4. The method of claim 1 wherein the strips have a first face and the strips are stacked vertically with the first face alternating between facing a first direction and a second opposite direction.

5. The method of claim 1 comprising a first step in which the strips are cut from a double layer of material to form a plurality of paired upper and lower strips, the upper strip matching in size to the lower strip, and the upper and lower strips arranged so that an upper strip and a matching lower strip are an equal number of strips from a center of the stack.

6. The method of claim 1 wherein, in a direction perpendicular to a line between the first and second openings, the top and bottom strips have a greater dimension than the remaining plurality of strips.

7. The method of claim 1 wherein the welds forming the stack are on non-intersecting lines.

8. The method of claim 1 wherein the material is woven nylon fabric.

9. The method of claim 1 wherein the welding is ultrasonic.

10. The method of claim 1 wherein the seatbelt webbing is used in a three-point vehicle occupant seatbelt.

11. A method of packing an automotive airbag comprising:
    welding at least four material strips into an inflatable bag such that, at weld joints between adjacent ones of the strips, a first strip lays flat on top of a second strip;
    stacking the strips in an accordion stack;
    welding first edges of a top and a bottom strip together;
    mounting the bag within a sleeve of a seatbelt webbing.

12. The method of claim 11 wherein the seat belt webbing is a chest strap in a three-point vehicle occupant seat.

13. The method of claim 11 wherein the welding includes edge joint welding pairs of first edges of the strips and edge joint welding opposed pairs of second edges of the strips staggered from the pairs of the first edges.

\* \* \* \* \*